Feb. 26, 1963

B. C. HAWKE 3,079,323

CONTROL ROD DRIVE COUPLING MECHANISM

Filed Nov. 7, 1961

Inventor
BASIL C. HAWKE
By Roland A. Anderson
Atty

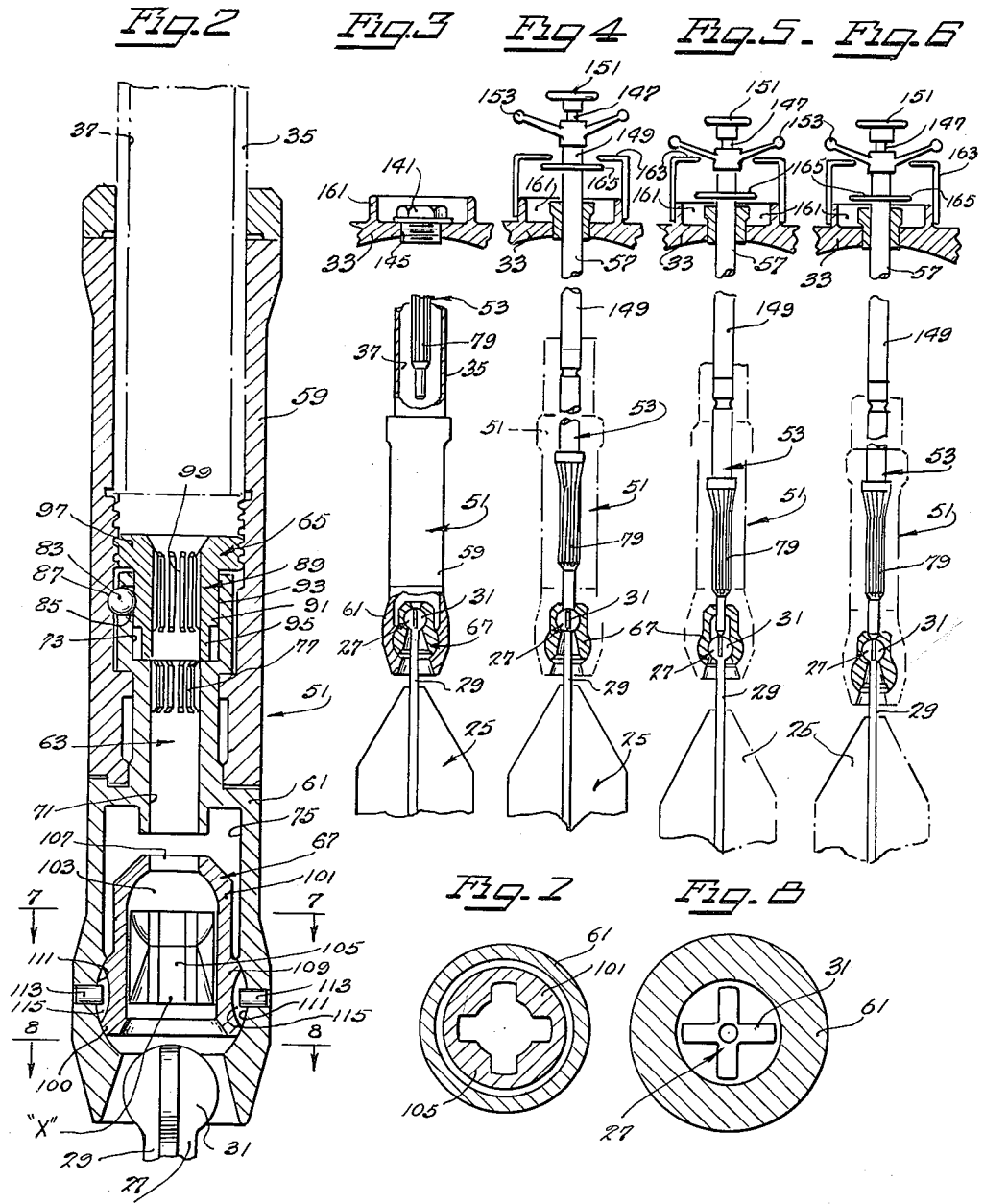

United States Patent Office
3,079,323
Patented Feb. 26, 1963

3,079,323
CONTROL ROD DRIVE COUPLING MECHANISM
Basil C. Hawke, San Diego, Calif., assignor, by mesne assignments, to the United States of America as represented by the United States Atomic Energy Commission
Filed Nov. 7, 1961, Ser. No. 150,851
9 Claims. (Cl. 204—193.2)

The invention relates generally to couplings and more particularly, to a coupling for releasably connecting a control rod to a control rod drive in a nuclear reactor.

The problem of connecting a first element to a second element at a remote point occurs in various situations. This problem is accentuated when the elements to be connected may be somewhat misaligned relative to each other. In a nuclear reactor, the coupling and uncoupling of a control rod with its associated drive mechanism involves both of the above problems, as well as others, as for instance, positive remote determination of engagement or disengagement.

As is generally well known, several control rods are commonly employed in a nuclear reactor for the purpose of controlling the reactivity rate, as for instance, to prevent the reactor from "running-away" and to safely "shut-down" the reactor, either under normal operating conditions, or under "scram" conditions. In general, control of the reactor is accomplished by individual positioning of the control rods relative to the reactive core. Such positioning of each control rod is generally accomplished by an associated control rod drive which is detachably connected to the associated control rod through a coupling or disconnect mechanism.

For various reasons, it is often desirable to uncouple a control rod from its associated drive. Subsequently, of course, the control rod should be recoupled of the drive for operational control. Preferably, the disconnect mechanism should be arranged so that both uncoupling and re-coupling are accomplished from a point located exteriorly of the reactor vessel, without generally disassembling the control rod drive, and without withdrawing the control rod from its inserted position relative to the core. For example, one such reason is to test the functioning of the drive, or the functioning of the associated control equipment. In addition, it is very desirable that the disconnect mechanism be arranged so as to eliminate the possibility of uncoupling occurring during operation of the reactor.

Accordingly, the principal object of the invention is the provision of a coupling mechanism for releasably connecting two elements. Other important objects of the invention are the provision of a coupling mechanism which is adapted for connecting two elements which are disposed with their axis in laterally and/or angularly displaced relation to each other, and the provision of a coupling mechanism incorporating means for locking the two connectable elements in locked condition and means for sensing the connected condition of the two connectable elements.

Still other objects of the invention are the provisions of an improved coupling or disconnect mechanism for a control rod drive associated with a nuclear reactor, and the provision of a control rod drive incorporating such a disconnect mechanism. Further objects of the invention include the provision of a disconnect mechanism in a control rod drive, which mechanism can be operated from the exterior of the reactor, and/or which is lockable so as to prevent uncoupling operation of the disconnect mechanism during operation of the reactor.

Other objects and advantages of the invention will become known by reference to the following description, and the accompanying drawings of one embodiment of the invention in which:

FIGURE 2 is an enlarged sectional view of one portion of the disconnect mechanism;

Figure 1:
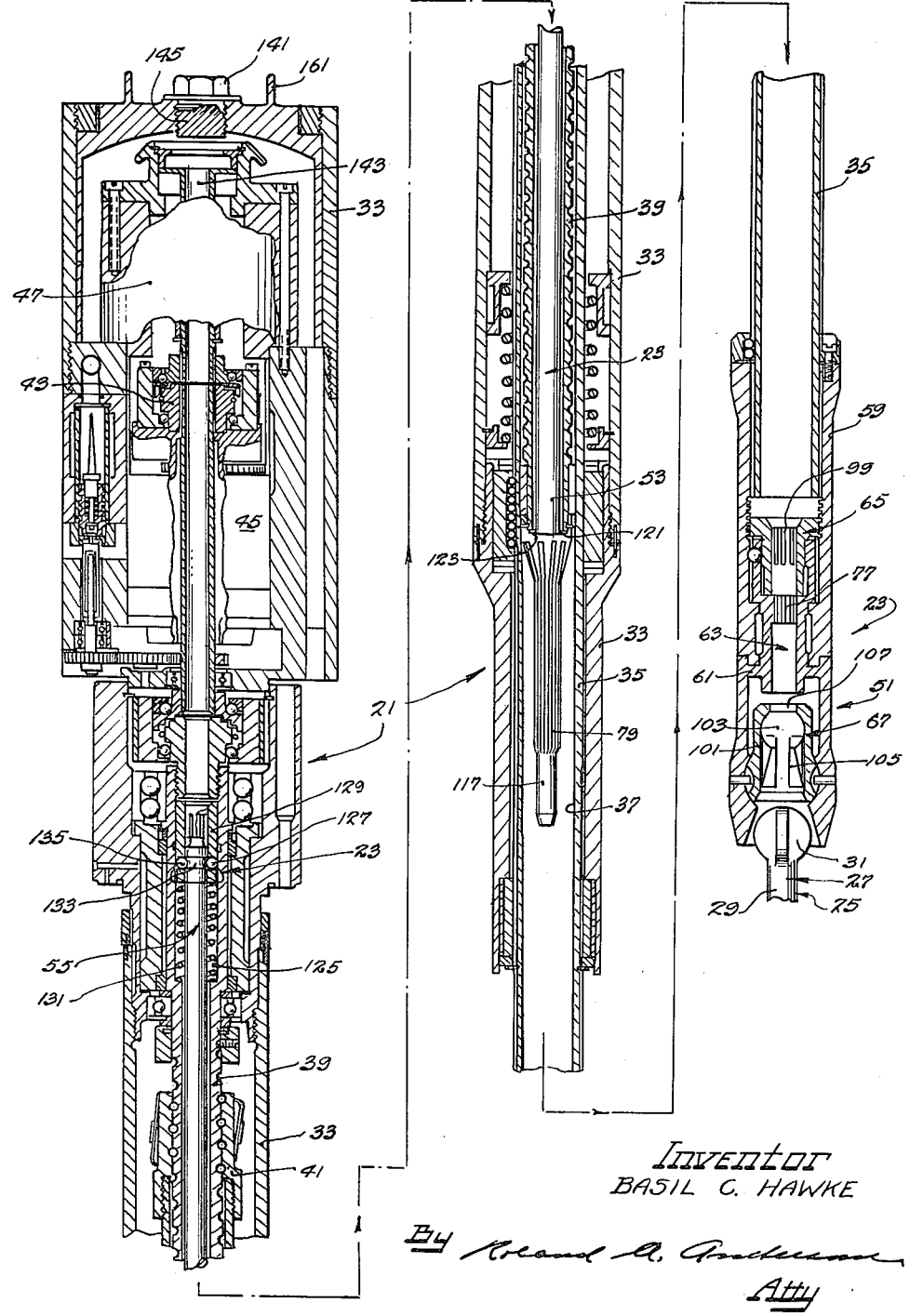
FIGURE 1 is a sectional view of a conrol rod drive incorporating a disconnect mechanism including various of the features of the invention.

FIGURES 3, 4, and 5 are diagrammatic views illustrating various stages of the uncoupling of a control rod from the disclosed disconnect mechanism;

FIGURE 6 is a view similar to FIGURES 3, 4, and 5, showing one stage in the control rod coupling operation of the disclosed disconnect mechanism;

FIGURE 7 is a sectional view taken along line 7—7 of FIGURE 2; and

FIGURE 8 is a sectional view taken along line 8—8 of FIGURE 2.

The drawings illustrate a coupling or disconnect mechanism in accordance with the invention, which mechanism is incorporated as a part of a control rod drive in a nuclear reactor. It should be understood, however, that the coupling mechanism 23 disclosed herein is not limited for use in a nuclear reactor.

The control rod drive 21, shown in FIGURE 1, is illustrative of one type of control rod drive adapted for incorporating the coupling mechanism 23, which is to be described, so as to detachably couple a control rod 25 to the drive, thereby to effect positioning of the control rod, incident to operation of the drive, relative to the reactive core of a nuclear reactor. The control rod 25 and the reactor are constructed so that axial travel of the control rod is guided by suitable means (not shown) which means also function with cooperating means on the control rod to prevent rotation of the control rod 25 about its axis. In addition, the reactor includes means (not shown) for engaging the control rod to limit its inward movement relative to the reactive core, thereby establishing a "fully-inserted" control rod position.

The constructional details of the control rod 25, apart from the means whereby the control rod is attached to the drive, are not a part of the disclosed invention and will not be disclosed herein, except to state that various constructions can be employed. The control rod 25 is formed for connection with the coupling mechanism 23 on the control rod drive 21, as shown best in FIGURES 1, 2, 7, and 8, through a bayonet type connection. In this regard, the control rod includes a male coupling member or blade 27 which is designed for cooperation with the coupling mechanism 23 to permit detachable connection of the control rod 25 to the control rod drive 21 when their respective axes are either laterally and/or angularly displaced from each other. In this regard, the male coupling member 27 includes a stem 29 which is connected at its lower end to the main body of the control rod and which, at its upper end, has an enlarged connecting head 31 with a lower outer surface of convex configuration to permit universal pivoting of the head relative to a mating support in the coupling mechanism 23. In addition, the connecting head 31 is constructed with an asymmetrical cross-section perpendicular to the axis of the control rod. This configuration, together with the convex lower surface of the enlarged connecting head, permits insertion of the head 31 through a passageway which has a cross-section corresponding to that of the head and which leads to an enlarged cavity having a supporting surface adapted for engaging the convex lower surface of the connecting head after the head clears the passageway within the cavity and is rotated relative to the passageway. In the disclosed construction, the enlarged connecting head 31 of the male coupling member 27 is cross-shaped in cross-section and its outer edge surfaces form portions of the surface of an imaginary sphere.

The control rod drive 21 is generally housed, as shown in FIGURE 1, in a containment or thimble 33 and includes an elongated drive or extension shaft 35 which incorporates a longitudinal bore 37 and which is carried by the containment 33 for axial movement relative to the reactive core. Various arrangements can be used for driving the extention shaft 35 relative to the core of the reactor. The illustrated arrangement includes a hollow lead screw 39 which is connected to the extension shaft 35 through a ball-nut coupling 41 so as to axially displace the extension shaft incident to rotation of the lead screw. In turn, the lead screw is driven, under normal conditions, through a suitable clutch 43 by a two-speed, reversible electric, positioning motor 45. In addition, the lead screw 39 is coupled to a suitable fluid motor 47 which is operable under "scram" conditions to rapidly displace the extension shaft 35 toward the reactive core.

Various arrangements can also be employed in the control rod drive 21 for preventing escape of reactor gases which are enterable into the drive through the open end of the extension shaft 35 adjacent to the reactive core. In addition, various arrangements can be used for controlling the operation of the positioning motor 45 and the "scram" motor 47, for decelerating the travel of the extension shaft 35 as the connected control rod approaches its "fully-inserted" position, and for preventing axial displacement of the extension shaft independently of, or contrary to, operation of either of the positioning or scram motors. The constructional details of the various control rod drive components and arrangements mentioned above are not a part of the disclosed invention to the extent that they do not effect the operation or performance of the coupling mechanism 23 still to be described. Accordingly, the various components and arrangements mentioned above will only be further described as necessary to fully disclose the structure and operation of the coupling mechanism 23.

As shown in FIGURE 1, the coupling mechanism basically includes a disconnect 51 connected to the lower end of the extension shaft 35, a reach rod 53 which is connectable with the disconnect 51 to effect operation thereof, a latch or lock means 55 which normally retains the reach rod 53 out of engagement with the disconnect 51, and an operating tool 57 (see FIGURES 3, 4, 5, and 6) which is insertable into the containment 33 for connection with the reach rod 53 to deactivate the latch means 55 and to effect operation of the disconnect 51.

The disconnect 51 includes, as seen best in FIGURE 2, a tubular or hollow housing 59 which is fixed to the lower end of the extension shaft 35, i.e., the end adjacent to the reactive core. Fixed to the housing 59 for rotation about the axis of the extension shaft 35, is a female coupling member 61 which includes a central bore 63. Located in the housing 59, at the upper end of the female coupling member 61, is a means 65 for releasably locking the female coupling member against rotation relative to the housing 59 and to the extension shaft 35 thereby permitting the control rod 25 to be locked to the extension shaft 35, as will be more fully explained.

Mounted in the lower end of the central bore 63 in the female coupling member 61, is means 67 for detachably receiving the enlarged connecting head 31 of the male coupling member 27. This connecting head receiving means 67 is mounted by suitable means, and is constructed for cooperation with the enlarged connecting head 31 of the control rod 25, so that the connecting head will be readily received therein for locked engagement even though there be some axial and/or angular misalignment between the axes of the control rod 25 and the extension shaft 35.

Considering the construction of the components of the disconnect 51 in greater detail, as seen in FIGURE 2, the bore 63 within the female coupling member 61 includes a central portion 71, together with respective enlarged upper and lower portions 73 and 75. Rotation of the female coupling member 61 relative to the housing 59 to lock the control rod 25 to the extension shaft 35 is facilitated, in the disclosed construction, by a splined formation 77 adjacent the upper end of the central bore portion 71, which splined formation is engageable by a mating splined formation 79 (see FIGURES 1, 3, 4, 5, and 6) at the lower end of the before mentioned reach rod 53. The enlarged lower portion 75 of the bore 63 houses the before mentioned connecting-head receiving means 67, and, at its extreme lower end, is of generally inverted funnel-shape to facilitate entry of the enlarged head 31 of the male coupling member 27.

Suitable means can be used for releasably locking the female coupling member 61 against rotation relative to the housing 59. The disclosed construction includes a ball-type lock including a series of balls 83 which are partially housed in a series of cylindrical recesses 85 in the upper part of the female coupling member 61 and which are movable axially of the recesses, i.e., radially of the axis of the extension shaft 35, between a locking position and a release position in which the female coupling member 61 is free to rotate relative to the housing 59.

In their locking positions, the balls 83 are seated in a series of pockets 87 in the inner wall of the tubular housing 59 and are retained against radially inward movement in the recesses, i.e., movement out of the pockets, by a locking element 89 which closes off the inner ends of the recesses 85 in the upper part of the female coupling member 61. The pockets 87 are located relative to the recesses 85 in the female coupling element 61 and relative to the means in the reactor for preventing rotation of the control rod such that, when the female coupling member is locked against rotation, the female coupling member 61 is oriented to prevent either coupling or uncoupling of the control rod 25.

The locking element 89 includes a hollow stem 91 which is received in the upper enlarged portion 73 of the female coupling member bore 63 and which includes an upper portion 93 serving to close off the inner ends of the recesses 85. The lower part of the stem includes a portion 95 of reduced diameter which permits radially inward movement of the balls from their pockets 87 in the housing wall. Extending from the upper end of the stem 91 is a collar or flange 97 which is threadedly engaged with the inner wall of the housing 59 so that rotation of the locking element 89 causes displacement thereof along the axis of the extension shaft 35.

When the locking element 89 is rotated to raise the locking element relative to the female coupling member 61, the smaller lower end portion 95 of the stem is exposed to the recesses 85, thereby permitting radially inward movement of the locking balls 83 from their pockets in the housing wall. This radially inward movement of the balls 83 frees the female coupling member 61 for rotation relative to the housing 59. Rotation of the locking element 89, either to seat the balls 83 in the pockets 87 so as to lock the female coupling member against rotation, or to permit radially inward movement of the balls from the pockets to free the female coupling member for rotation, is facilitated by providing the bore of the locking element stem with a splined formation 99 which is engageable with the before mentioned splined formation 79 at the lower end of the reach rod 53.

The connecting-head receiving means 67 constitutes a bayonet-type socket 101 including a cavity 103 at the upper end of the socket and an entry passageway 105 which leads from the lower end of the socket to the cavity and has a cross-section which corresponds to the asymmetrical cross-section of the connecting head 31 of the male coupling member 27, and which tapers downwardly and outwardly toward the entrance opening. This configuration of the passageway permits free passage of the enlarged connecting head 31 to the cavity and allows a limited amount of angular misalignment of the connecting head 31 relative to the passageway 105. The entrance opening of the passageway 105 is positioned adjacent to the inverted funnel-shaped part of the female coupling member 61, thereby facilitating initial entry of the connecting head 31 into the passageway 105. As seen in the drawings, the socket 101 also includes a central bore 107 in the upper wall of the cavity 103, which bore is in general alignment with the axis of the extension shaft 35.

The cavity 103 is constructed to permit free relative rotation therein between the connecting head 31 and the socket 101, and, when the head 31 is rotated out of rotative alignment with the passageway 105, to support the head against separation of the control rod 25 from the extension shaft 35. In the disclosed construction the cavity 103 is generally spherical in shape, thereby permitting some angular shifting of the axis of the control rod relative to the axis of the extension shaft, while at the same time, permitting rotation of the socket 101 relative to the head 31 about the axis of the extension shaft 35.

As noted before, the socket 101 is mounted within the lower enlarged portion 75 of the coupling bore 63 so as to permit connection of the socket with the connecting head when the socket and head are either laterally or angularly misaligned. The mounting of the socket within the lower portion of the coupling bore is also such that the socket 101 rotates with the female coupling member 61, thereby swinging the socket relative to the connecting head of the male connecting member on the control rod, which as mentioned before, is held against rotation by its mounting in the reactor.

In the disclosed construction, the mounting of the socket 101 in the enlarged lower portion 75 of the coupling bore 63, includes a spherical projection or hub 109 at the lower end of the socket, which hub has an outer convex surface generated by a radius acting from a point "X" disposed within the lower end of the socket in general alignment with the axis of the extension shaft 35. The hub 109 is received in a mating seat 111 formed in the inner wall of the lower enlarged portion 75 of the coupling bore 63. Extending generally centrally from the seat 111 are a pair of axially aligned opposed posts or pivot pins 113, each of which extends into a generally vertical groove or slot 115 in the adjacent area of the hub 109. As a result, the socket 101 can be universally pivoted, within limits, in the lower enlarged portions 75 of the bore 63 of the female coupling member 61. At the same time, rotation of the female coupling member 61 about the axis of the extension shaft 35 causes relative rotation of the socket 101 with respect to the connecting head 31 of the male coupling member 27.

The female coupling member 61 is rotatably operative, after release of the locking means 65, and the locking means 65 is rotatably operative to release the female coupling member 61 for free rotation, by the before mentioned reach rod 53. In the disclosed construction, the reach rod 53 is an elongated cylindrical member which is partially housed in the hollow lead screw 39 (see FIGURE 1) and which is releasably retained in a retracted position out of engagement with the locking means 65 and the female coupling member 61 by the latch means 55. Adjacent to its lower end, the reach rod 53 includes the before mentioned splined formation 79 which is operably engageable with the respective splined formations 99 and 77 in the bores in the locking element 89 and in the female coupling member 61. At its extreme lower end, the reach rod 53 includes a portion 117 of reduced diameter.

Entry of reactor gases into the lead screw 39 can be prevented by various arrangements. In the disclosed construction, as shown in FIGURE 1, a sealing member 121 is seated in a recess in a shoulder or flange 123 extending from the reach rod 53 at a point above the splined formation 79, which sealing member 121 is adapted to be seated against the lower end of the lead screw 39 when the reach rod is in its retracted position.

The latch means 55 which serves to retain the reach rod 53 in its upper or retracted position, is a spring loaded ball-type, detent latch. More particularly, as shown in FIGURE 1, the latch means is housed in an enlarged upper portion 125 of the bore in the lead screw 39 and comprises a series of balls 127 which are partially retained in a bushing 129 which is movable axially of the lead screw. As shown in the drawings, the bushing is housed between the inner wall of the enlarged lead screw bore portion 125, and the outer wall of the upper end of the reach rod 53. The bushing 129 is biased outwardly, relative to the reactive core, by a spring 131 which is supported at the lower end of the enlarged lead screw bore portion 125, thereby normally seating a portion of each of the balls 127 in an annular groove 133 adjacent the upper end of the reach rod 53. Seating of the balls in the groove 133 latches the reach rod in its retracted position.

When the reach rod 53 is pressed inwardly by the operating tool 57, the inwardly directed force is transmitted by the balls 127 to the bushing 129 which is, accordingly, inwardly displaced against the action of the spring 131. When the bushing is inwardly displaced a predetermined amount, the balls 127 are exposed to a groove or recess 135 in the inner wall of the lead screw 39 to permit radially outward movement of the balls 127 from the annular groove 133, thereby freeing the reach rod 53 for axial displacement independently of the latch means 55.

The reach rod 53 is released from its retracted position and operably engaged with the locking element 89 and with the female coupling member 61 by the operating tool 57. In order to allow engagement of the operating tool 57 with the reach rod 53, the open upper end of the lead screw 39 is accessible through a removable plug 141 (see FIGURES 1, 3, 4, 5, and 6) in the top of the containment 33 and through a suitable passageway 143 (see FIGURE 1) leading from the plug opening 145 to the upper end of the lead screw 39.

The operating tool can be controlled in various ways to accommodate connection to the reach rod 53 so as to effect axial displacement of the reach rod and rotation of the reach rod. The disclosed operating tool includes elongated inner and outer elements 147 and 149, each having a respective hand operating knob or handle 151 and 153. The inner or central element 147 is threadably engageable with the upper end of the reach rod 53 (see FIGURE 1) to connect the tool 57 with the reach rod. The outer element 149 includes a splined portion (not shown) which engages a mating splined portion (not shown) at the upper end of the reach rod so that rotation of the tool 57, as a whole, causes related rotation of the reach rod 53.

As shown in the drawings, the plug opening 145 is generally surrounded by an upstanding collar 161 which serves to permit attachment of a retaining bar or plate 163. The retaining bar, as will be explained in connection with the operation of the disconnect mechanism 23, is attached to the collar 161, after the tool 57 has been threadably connected to the reach rod 53 and after lowering of the reach rod 53 from its retracted position, so as to be located in position for engagement with a flange 165 on the operating tool to prevent excessive withdrawal of the tool while permitting free rotation of the disconnect mechanism.

In order to disconnect the control rod 25 in the reactor from the associated control rod drive, the extension shaft 35 is driven inwardly toward the reactive core to a position spaced adjacent to its inwardmost position, as shown in FIGURE 3. More specifically, the extension shaft is driven inwardly to a position spaced from its inwardmost position at a distance approximately equal to the length of engagement of the male coupling member in the female coupling member. In the disclosed construction, the control rod is located at a point about two inches from its "fully-inserted" position. The plug 141 at the top of the containment 33 is then removed and the operating tool 57 is inserted to engage the reach rod 53. In this connection, the inner element 147 is first rotated by the handle until the tool is threadably attached to the reach rod. The tool 57 is then utilized to apply an inward force of sufficient strength to overcome the ball-type detent latch means 55. When the detent latch means is disengaged, the reach rod is then lowered until the portion 117 at the lower end of the reach rod passes through the splined formation 99 in the bore of the stem 91 of the locking element 89, through the splined formation 77 in the bore 63 of the female coupling member 61, and through the bore 107 in the upper wall of the socket 101, to engage the top of the enlarged connecting head 31 of the control rod 25, as seen in FIGURE 4. With the tool 57 in this condition, a suitably inscribed marking (not shown) on the tool is lined up relative to a standard (not shown) at the top of the containment so as to indicate that the control rod is located in slightly spaced relation to its "fully-inserted" position, which in the disclosed construction, is about two inches.

At this time, the retaining bar 163 is engaged to the collar 161 in position to engage the flange 165 on the tool 57 to restrain excessive outward movement of the tool. The tool is then withdrawn sufficiently to engage the splined formation 79 of the reach rod 53 with the splined formation 99 of the bore in the locking element 89. The tool 57, when in this position, can then be rotated by the handle 153 to unlatch the locking means 65 so as to permit rotation of the female coupling member 61.

After release of the locking means, the reach rod 53 is then additionally inserted to engage the splined formation 79 with the splined formation 77 in the bore 63 in the female coupling member 61. When thus engaged, the female coupling member can be rotated between stops (not shown) to line up the passageway 105 in the socket 101 with the enlarged connecting head 31 of the control rod 26.

When the passageway is lined up with the head 31, the reach rod is then further inserted through the bore 107 in the upper wall of the socket 101, as shown in FIGURE 5, to engage the lower end of the portion 117 of the reach rod with the enlarged connecting head 31 of the control rod 25 so as to push the control rod from the female coupling member 61 to the "fully-inserted" control rod position. In normal operation the control rod simply will drop into the "fully-inserted" position and the reach rod may be allowed to move downwardly the short distance with it. At this point, the marking (not shown) on the tool 57 should be displaced inwardly approximately two inches from the before mentioned standard (not shown) on the containment. If it is desired to uncouple the control rod when in its "fully-inserted" position, the locking means 65 is first released, then the passageway 105 in the socket 101 is lined up with the enlarged head of the male coupling element 27, and then the extension shaft can be slowly raised while the reach rod is employed to retain the control rod in its "fully-inserted" position. From the preceding description of alternate disconnecting operations it can be seen that a positive remote determination of disengagement may be made from the fact that the reach rod, when in contact with the enlarged head of the male coupling element, and hence the tool, does not move upon slight upward movement of the extension shaft.

With the control rod 25 thus disconnected from the extension shaft 35, the female coupling member 61 is preferably rotated back to the position in which it can be locked. In addition, the locking element 89 is preferably operated to lock the female coupling member 61. The retaining bar 163 is then removed and the tool 57 is withdrawn, returning the reach rod 53 to its retracted position so as to permit re-engagement of the detent latch means 55. The tool 57 is then unscrewed from the reach rod 53, removed from the containment 33, and the plug 141 is again secured to the containment.

Connection of the head 31 of the control rod 25 to the control rod drive 21 involves a similar, but partially reversed sequence of steps. In this connection, when the extension shaft 35 is spaced slightly from its innermost position, about two inches in the disclosed construction, the female coupling member 61 in unlocked and rotated to align the passageway 105 with the connecting head 31 of the male coupling member 27 on the control rod 25. The extension shaft is then moved to its innermost position, as shown in FIGURE 6, which movement serves to receive the connecting head 31 of the male coupling member on the control rod 25 in the cavity 103 in the socket 101. When the extension shaft 35 is in its innermost position, the female coupling member 61 can then be rotated to its locked position, and the locking means 65 set so as to prevent rotation of the female coupling member, thereby avoiding disconnection of the control rod 25 from the extension shaft 35. The reach rod 53 can be lowered through the locking element 89, the female coupling member 61, and through the bore 107 to engage the lower tip of the portion 117 with the connecting head 31 of the control rod so as to determine if the connecting head 31 is properly seated in the socket 103 of the female coupling member 61. If slight upward movement of the extension shaft is accompanied by identical movement of the rod, through movement of the reach rod, positive remote determination can be made of engagement.

The disclosed disconnect 51 is especially designed for operation at elevated temperatures, there being no springs or similar devices which, through deterioration or relaxation after prolonged exposure to high temperatures and radiation, could cause malfunctioning. Furthermore, two separate operations are required to effect both coupling and uncoupling. First, the coupling locking means 65 must be released. Second, the female coupling member 61 must be rotated to release or engage the control rod 25. However, the second operation is only possible after completion of the first operation. In addition, the disclosed construction permits lateral and/or angular displacement within limits, of the control rod axis relative to the axis of the extension shaft of the control rod drive. Moreover, coupling or uncoupling of the control rod can be accomplished without withdrawal of the control rod from its "fully-inserted" position in the reactor.

Various features of the invention are set forth in the following claims.

What is claimed is:

1. A coupling mechanism for connecting a rod having an enlarged head portion forming a male coupling member with an elongated shaft having a lengthwise bore therein, said coupling mechanism comprising a female coupling member rotatably attached to one end of the shaft, and means accessible through said bore for releasably locking said female coupling member to said shaft to prevent rotation therebetween, said female coupling member including a bayonet type socket, said socket being proportioned for receiving the enlarged head portion of said rod and being so shaped relative to the head portion so that rotation of said socket relative to the head, when the head is fully inserted in said socket, is effective to lock said rod to said shaft.

2. A coupling mechanism for connecting a rod having an enlarged head portion forming a male coupling member with an elongated shaft having a lengthwise bore therein, said coupling mechanism comprising a female coupling member rotatably attached to one end of the shaft, means accessible through said bore for releasably locking said female coupling member to said shaft to prevent rotation therebetween, said female coupling member including a bayonet type socket, said socket being proportioned for receiving the enlarged head portion of said rod and being so shaped relative to the head portion so that rotation of said socket relative to the head, when the head is fully inserted in said socket, is effective to lock said rod to said shaft, and a locking rod positionable in the bore and having at one end thereof means for non-rotatably engaging said releasable locking means so as to afford locking and unlocking operation thereof, and for non-rotatably engaging said female coupling member for rotation thereof when said locking means is unlocked.

3. A coupling mechanism for connecting a rod having an enlarged head portion forming a male coupling member with an elongated shaft having a lengthwise bore therein, said coupling mechanism comprising a female coupling member rotatably attached to one end of the shaft, means accessible through the bore for releasably locking said female coupling member to the shaft to prevent rotation therebetween, said female coupling member including a bayonet type socket pivotably mounted at the end thereof, said socket being proportioned for receiving the enlarged head portion of the rod and being so shaped relative to the head portion so that rotation of said socket relative to said head, when the head is fully inserted in said socket, is effective to lock the rod to the shaft, said socket having an opening therein in communication with the bore, and means positionable in the bore for engageably operating said releasably locking means, for engaging said coupling to rotate said coupling when said locking means is released, and for projection through said opening into said socket to determine the presence therein of the head portion.

4. A coupling mechanism for connecting a rod having an enlarged head portion forming a male coupling member with an elongated shaft having a lengthwise bore therein, said coupling mechanism comprising a female coupling member rotatably attached to one end of the shaft, said female coupling member having a bore therein in alignment with the bore in the shaft and a splined configuration on the interior wall of said bore, means accessible through the bore in the shaft and through said bore in said female coupling member for releasably locking said female coupling member to the shaft incident to rotation of said locking means so as to prevent rotation between said female coupling member and the shaft, said releasable locking means including a bore in alignment with the bore in the shaft and a splined configuration on the interior wall of said bore, said female coupling member being pivotally mounted on said housing and including a bayonet type socket pivotably mounted on the end thereof, said socket being proportioned for receiving the enlarged head portion of said rod, said head portion and said socket being so shaped relative to each other that rotation of said socket relative to said head, when the head is fully inserted in said socket is effective to lock said rod to said shaft, and a locking rod positionable in the bore of the shaft and having at one end thereof a splined configuration which is selectively engageable with said releasable locking means so as to afford locking and unlocking operation thereof and with said female coupling member for rotation thereof when said locking means is unlocked.

5. A coupling mechanism comprising a rod having an enlarged head portion forming a male coupling member, an elongated shaft having a longitudinal bore therein, a female coupling attached to one end of said shaft, said coupling having therein a bore in communication with said bore in said shaft and being rotatable relative to said shaft, means accessible through said bore in said shaft for releasably locking said female coupling against rotation, a bayonet type socket carried by said female coupling, said socket being proportioned for receiving the enlarged head portion of said rod, said head portion and said socket being so shaped relative to each other that rotation of said socket relative to said head, when the head is fully inserted in said socket, is effective to lock said rod to said shaft, rotatable means carried in said bore of said shaft for selective longitudinal displacement relative to said shaft from a retracted position to operative positions of engagement with said locking means so as to effect release of said female coupling for rotation and with said female coupling so as to rotate said socket relative to said enlarged head portion, sealing means between said axially displaceable means and said shaft for preventing passage of fluid through said shaft when said axially displaceable, rotatable means is in said retracted position, means releasably retaining said axially displaceable, rotatable means in said retracted position to prevent the passage of fluid through said shaft and to prevent operative engagement of said axially displaceable, rotatable means with said locking means and with said coupling, and means for engaging said axially displaceable, rotatable means to disconnect said axially displaceable, rotatable means from said retracted position so as to permit operative engagement of said axially displaceable, rotatable means with said locking means and with said coupling.

6. A coupling mechanism for releasably attaching a first element having a bore therein to a second element which may be misaligned with said first element, said second element including a male coupling member having an enlarged head with a cross section with is asymmetrical about an axis perpendicular to the plane of the cross section, said coupling mechanism including a female coupling member attached to said first element, said female coupling member having therein a bore communicating with the bore in said first element, means accessible through the bore in said first element for releasably locking said female coupling member, said socket being formed with an inner cavity and a passageway leading to said cavity, said cavity being proportioned for receiving the enlarged head of the male coupling member and for permitting relative rotation between the head of the male coupling member and said socket, said passageway having a cross section corresponding to the cross section of the head of the male coupling member, whereby entry of the head of the male coupling member into said cavity is permitted and whereby rotation of said socket relative to the head, when the head is fully inserted in said cavity, is effective to releasably prevent disconnection of the second element from said first element, means connecting said socket with said female coupling member for rotation of said socket with said female coupling member and for pivotal movement of said socket relative to said female coupling member, and means insertable through said first element for selective engagement with said locking means so as to effect release of said female coupling member for rotation, and with said female coupling member so as to rotate said socket relative to the enlarged head of the male coupling member.

7. A control rod drive for a nuclear reactor, said control rod drive being adapted for connection with a control rod having a male coupling element including an enlarged head with a cross section which is asymmetrical about an axis perpendicular to the plane of the cross section, said control rod drive including an elongated drive shaft which is axially movable relative to the core of the reactor and has an axial bore therein, a lead screw located in said drive shaft, said lead screw being coupled to said drive shaft so that lead screw rotation causes axial displacement of said drive shaft, said lead screw having a central bore therein communicating with said drive shaft bore, a female coupling member attached to said drive shaft at the end thereof adjacent the core of the reactor, said female coupling member having therein a bore in communication with said lead screw bore through said drive shaft bore and being rotatable relative to said drive shaft, means accessible through said drive shaft bore for releasably locking said female coupling member against rotation, a bayonet type socket carried by said female coupling member at the end thereof adjacent to the core of the reactor, said socket being formed with an inner cavity and a passageway leading to said cavity, said cavity being proportioned for receiving the enlarged head of the male coupling member and for permitting relative rotation between the head of the male coupling member and said socket, said passageway having a cross section corresponding to the cross section of the head of the male coupling member whereby entry of the head of the male coupling member into the cavity is permitted and whereby rotation of said socket relative to the head when the head is fully inserted in said cavity, is effective to prevent disconnection of the control rod from said drive shaft, means connecting said socket with said female coupling member for rotation of said socket with said female coupling member and for pivotal movement of said socket relative to said female coupling member, and rotatable means carried by said lead screw for selective axial displacement relative to said lead screw and through said drive shaft bore from a retracted position to operative positions for engagement with said locking means so as to effect release of said female coupling member for rotation and with said female coupling member so as to rotate said socket relative to the enlarged head of the male coupling member.

8. A control rod drive for a nuclear reactor, said control rod drive being adapted for connection with a control rod having a male coupling element including an enlarged head with a cross section which is asymmetrical about an axis perpendicular to the plane of the cross section, said control rod drive including an elongated drive shaft which is axially movable relative to the core of the reactor and has an axial bore therein, a lead screw located in said drive shaft, said lead screw being coupled to said drive shaft so that lead screw rotation causes axial displacement of said drive shaft, said lead screw having a central bore therein communicating with said drive shaft bore, a female coupling member attached to said drive shaft at the end thereof adjacent the core of the reactor, said female coupling member having therein a bore in communication with said lead screw bore through said drive shaft bore and being rotatable relative to said drive shaft, means accessible through said drive shaft bore for releasably locking said female coupling member against rotation, a bayonet type socket carried by said female coupling member at the end thereof adjacent to the core of the reactor, said socket being formed with an inner cavity and a passageway leading to said cavity, said cavity being proportioned for receiving the enlarged head of the male coupling member and for permitting relative rotation between the head of the male coupling member and said socket, said passageway having a cross section corresponding to the cross section of the head of the male coupling member, whereby entry of the head of the male coupling member into the cavity is permitted and whereby rotation of said socket relative to the head, when the head is fully inserted in said cavity, is effective to prevent disconnection of the control rod from said drive shaft, means connecting said socket with said female coupling member for rotation of said socket with said female coupling member and for pivotal movement of said socket relative to said female coupling member, rotatable means carried by said lead screw for selective axial displacement relative to said lead screw and through said drive shaft bore from a retracted position to operative positions for engagement with said locking means so as to effect release of said female coupling member for rotation and with said female coupling member so as to rotate said socket relative to the enlarged head of the male coupling member, means releasably retaining said axially displaceable, rotatable means in said retracted position to prevent operative engagement of said axially displaceable, rotatable means with said locking means and with said female coupling member, and means for engaging said axially displaceable, rotatable means to disconnect said axially, displaceable, rotatable means from said retracted position so as to permit operable engagement of said axially displaceable, rotatable means with said locking means and with said female coupling member.

9. A control rod drive for a nuclear reactor, said control rod drive being adapted for connection with a control rod having a male coupling element including an enlarged head with a cross section which is asymmetrical about an axis perpendicular to the plane of the cross section, said control rod drive including an elongated drive shaft which is axially movable relative to the core of the reactor and has an axial bore therein, a lead screw located in said drive shaft, said lead screw being coupled to said drive shaft so that lead screw rotation causes axial displacement of said drive shaft, said lead screw having a central bore therein communicating with said drive shaft bore, a female coupling member attached to said drive shaft at the end thereof adjacent the core of the reactor, said female coupling member having therein a bore in communication with said lead screw bore through said drive shaft bore and being rotatable relative to said drive shaft, means accessible through said drive shaft bore for releasably locking said female coupling member against rotation, a bayonet type socket carried by said female coupling member at the end thereof adjacent to the core of the reactor, said socket being formed with an inner cavity and a passageway leading to said cavity, said cavity being proportioned for receiving the enlarged head of the male coupling member and for permitting relative rotation between the head of the male coupling member and said socket, said passageway having a cross section corresponding to the cross section of the head of the male coupling member, whereby entry of the head of the male coupling member into the cavity is permitted and whereby rotation of said socket relative to the head, when the head is fully inserted in said cavity, is effective to prevent disconnection of the control rod from said drive shaft, means connecting said socket with said female coupling member for rotation of said socket with said female coupling member and for pivotal movement of said socket relative to said female coupling member, rotatable means carried by said lead screw for selective axial displacement relative to said lead screw and though said drive shaft bore from a retracted position to operative positions for engagement with said locking means so as to effect release of said female coupling member for rotation and with said female coupling member so as to rotate said socket relative to the enlarged head of the male coupling member, means releasably retaining said axially displaceable, rotatable means in said retracted position to prevent operative engagement of said axially displaceable, rotatable means with said locking means and with said female coupling member, means for engaging said axially displaceable, rotatable means to disconnect said axially, displaceable, rotatable means from said retracted position so as to permit operable engagement of said axially displaceable, rotatable means with said locking means and with said female coupling member, and sealing means between said axially displaceable means and said lead screw for preventing the escape of fluid from the core of the reactor when said axially displaceable means is in said retracted position.

No references cited.